US009524599B2

(12) United States Patent
Lin et al.

(10) Patent No.: US 9,524,599 B2
(45) Date of Patent: Dec. 20, 2016

(54) VEHICLE KEY SYSTEM AND METHODS FOR USING THE SAME

(71) Applicant: HON HAI PRECISION INDUSTRY CO., LTD., New Taipei (TW)

(72) Inventors: Shiang-Hua Lin, New Taipei (TW); Kuang-Yao Liao, New Taipei (TW); Ping-Mao Lee, New Taipei (TW); Wen-Shian Tsai, New Taipei (TW); Fang-Yu Jhao, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/788,102

(22) Filed: Jun. 30, 2015

(65) Prior Publication Data

US 2016/0314634 A1 Oct. 27, 2016

(30) Foreign Application Priority Data

Apr. 22, 2015 (TW) .............................. 104112883 A

(51) Int. Cl.

| G05B 19/00 | (2006.01) |
|---|---|
| G05B 23/00 | (2006.01) |
| G06F 7/00 | (2006.01) |
| G06F 7/04 | (2006.01) |
| G06K 19/00 | (2006.01) |
| G08B 29/00 | (2006.01) |
| G08C 19/00 | (2006.01) |
| H04B 1/00 | (2006.01) |
| H04B 1/38 | (2015.01) |
| H04B 3/00 | (2006.01) |
| H04Q 1/00 | (2006.01) |

(Continued)

(52) U.S. Cl.
CPC .......... *G07C 9/00174* (2013.01); *H02J 17/00* (2013.01); *G07C 2009/00785* (2013.01)

(58) Field of Classification Search
CPC ................. G07C 9/00174; G07C 2009/00785; H02J 17/00
See application file for complete search history.

(56) References Cited

U.S. PATENT DOCUMENTS

| 5,889,603 A | 3/1999 | Roddy et al. |
|---|---|---|
| 6,351,206 B1 | 2/2002 | Schweiger et al. |

(Continued)

FOREIGN PATENT DOCUMENTS

| CN | 202788227 U | 3/2013 |
|---|---|---|
| CN | 202788320 U | 3/2013 |

(Continued)

*Primary Examiner* — Erin File
(74) *Attorney, Agent, or Firm* — Zhigang Ma

(57) ABSTRACT

A vehicle key system includes a transmitting device issuing optical signals and a receiving device. The transmitting device includes a light source module. An optical signal with predetermined Identification (ID) information is generated by the light source module and the optical signal is converted into an electrical signal. A signal receiving module of the receiving device verifies the electrical signal and controls a vehicle to unlock. An electronic energy is converted into an electromagnetic signal and the electromagnetic signal is broadcast. A wireless charging receiver of the transmitting device receives the electromagnetic signal and generates the electronic energy. The present disclosure also provides a method for using the vehicle key system.

10 Claims, 2 Drawing Sheets

(51) Int. Cl.
*H04Q 9/00* (2006.01)
*G07C 9/00* (2006.01)
*H02J 17/00* (2006.01)

(56) References Cited

U.S. PATENT DOCUMENTS

| | | | | |
|---|---|---|---|---|
| 8,841,987 | B1* | 9/2014 | Stanfield | G07C 9/00896 340/5.61 |
| 2008/0281518 | A1* | 11/2008 | Dozier | G07C 5/008 701/469 |
| 2015/0145645 | A1* | 5/2015 | Stanfield | G07C 9/00896 340/5.61 |
| 2015/0162984 | A1* | 6/2015 | Liu | G08C 23/04 398/115 |
| 2015/0188633 | A1* | 7/2015 | Liu | H04L 9/3226 398/118 |

FOREIGN PATENT DOCUMENTS

| | | |
|---|---|---|
| CN | 103093519 A | 5/2013 |
| CN | 101974991 B | 11/2014 |
| DE | 20014954 U1 | 11/2000 |
| GB | 1529789 A | 10/1978 |
| WO | 95/09747 A2 | 4/1995 |

* cited by examiner

VEHICLE KEY SYSTEM AND METHODS FOR USING THE SAME

FIELD

The subject matter herein generally relates to security systems.

BACKGROUND

A smart key system enables the locking and opening of doors of a vehicle without using a mechanical key. In this smart key system, wireless communication is performed between a portable electronic key which is carried by a user and a control device mounted in a vehicle. When a request from a regular user is confirmed by checking the ID information of both sides, the opening of the doors is permitted, for example.

BRIEF DESCRIPTION OF THE DRAWINGS

Implementations of the present technology will now be described, by way of example only, with reference to the attached figures.

DETAILED DESCRIPTION

Figure 1:
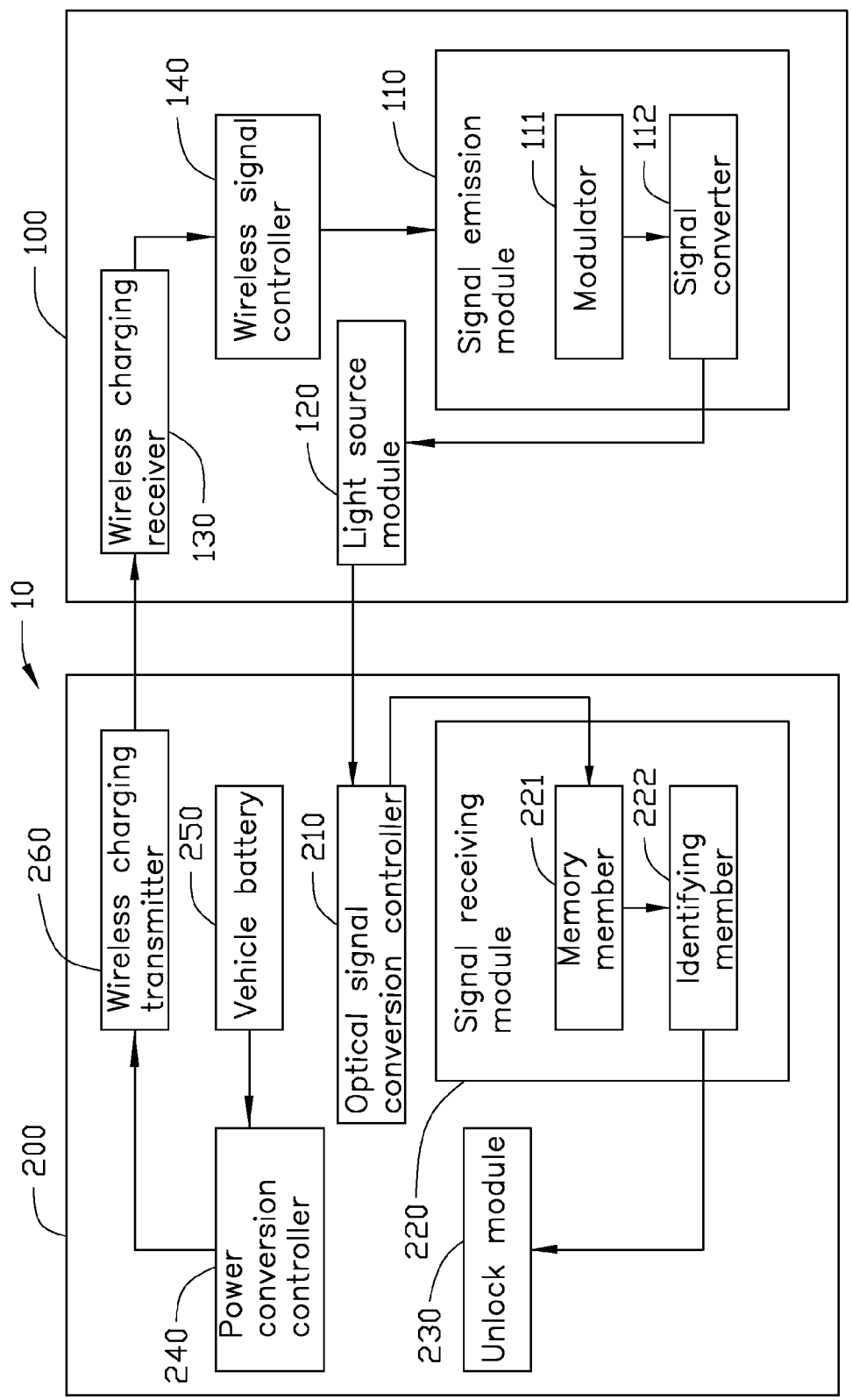
FIG. 1 is a block diagram of an embodiment of a vehicle key system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" when utilized, means "including, but not necessarily limited to"; it specifically indicates open-ended inclusion or membership in the so-described combination, group, series and the like.

FIG. 1 illustrates an embodiment of a vehicle key system 10. The vehicle key system 10 can include a transmitting device 100 and a receiving device 200 mounted in a vehicle (not shown). The transmitting device 100 and the receiving device 200 can communicate by optical signals. In this embodiment, the transmitting device 100 can be a smart key for the vehicle.

The transmitting device 100 can include a signal emission module 110, a light source module 120, a wireless charging receiver 130 and a wireless signal controller 140.

The signal emission module 110 can be configured to generate a regulating signal and can control the light source module 120 to generate an optical signal with predetermined Identification (ID) information. The signal emission module 110 can include a modulator 111 and a signal converter 112. The modulator 111 can generate a predetermined input signal. In another embodiment, the modulator 111 can include a plurality of buttons, and a predetermined input signal can be generated by triggering the plurality of buttons. The signal converter 112 can convert the input signal to a dimming control signal. The signal converter 112 can transmit the dimming control signal to the light source module 120 and control the light source module 120 to generate the optical signal with a predetermined ID information.

The light source module 120 can generate the optical signal with the predetermined ID information by the control of the signal emission module 110. In this embodiment, the light source module 120 can include a plurality of LEDs (Light Emitting Diodes), and the light emitted by the LEDS can be visible light. The light emitted by the light source module 120 can travel in a straight line of slight, and the ID information can be directly obtained in the straight line when within sight to improve the anti-theft performance of the vehicle. The light emitted by the light source module 120 can be visible light configured for illumination and intensity in the dark.

The wireless charging receiver 130 can receive an electromagnetic signal configured for wireless charging and can convert the electromagnetic signal to electronic energy.

The wireless signal controller 140 can be configured to control the wireless charging receiver 130 and transmit the electronic energy generated by the wireless charging receiver 130 to the signal emission module 110 and the light source module 120. Therefore, the transmitting device 100 can itself work without a separate power source.

The receiving device 200 can include an optical signal conversion controller 210, a signal receiving module 220, an unlock module 230, a power conversion controller 240, a vehicle battery 250, and a wireless charging transmitter 260.

The optical signal conversion controller 210 can be configured to receive the optical signal generated by the light source module 120 and convert the optical signal with the predetermined ID information into an electrical signal having matching ID information which is based on the predetermined ID information. The optical signal conversion controller 210 can be used with a condenser lens and a filter lens.

The signal receiving module 220 can be configured to receive and authenticate the electrical signal converted by the optical signal conversion controller 210. The signal receiving module 220 can include a memory member 221 and an identifying member 222. The memory member 221 can save a signal sample. The identifying member 222 can compare the electrical signal received from the optical signal conversion controller 210 with the signal sample and send a controlling signal to the unlock module 230 if the comparison reveals the correct ID information.

The unlock module 230 can be electrically coupled to the signal receiving module 220 and can be configured to lock or unlock the vehicle.

The power conversion controller 240 can be configured to control the vehicle battery 250 and convert the electronic energy generated by the vehicle battery 250 into the electromagnetic signal.

The wireless charging transmitter 260 can be configured to transmit the electromagnetic signal to the wireless charging receiver 130 by the control of the power conversion controller 240.

In another embodiment, the wireless charging transmitter 260 and the wireless charging receiver 130 can be paired to avoid the electronic energy of the vehicle battery 250 from being stolen by other wireless charging receivers.

In another embodiment, the transmitting device 100 can further include a battery (not shown) electrically coupled to the wireless signal controller 140. The wireless signal controller 140 can transmit the electronic energy generated by the wireless charging receiver 130 to the battery.

The signal sample can be generated by the receiving device 200 and be saved in the memory member 221 when the vehicle key system 10 is first used.

Figure 2:
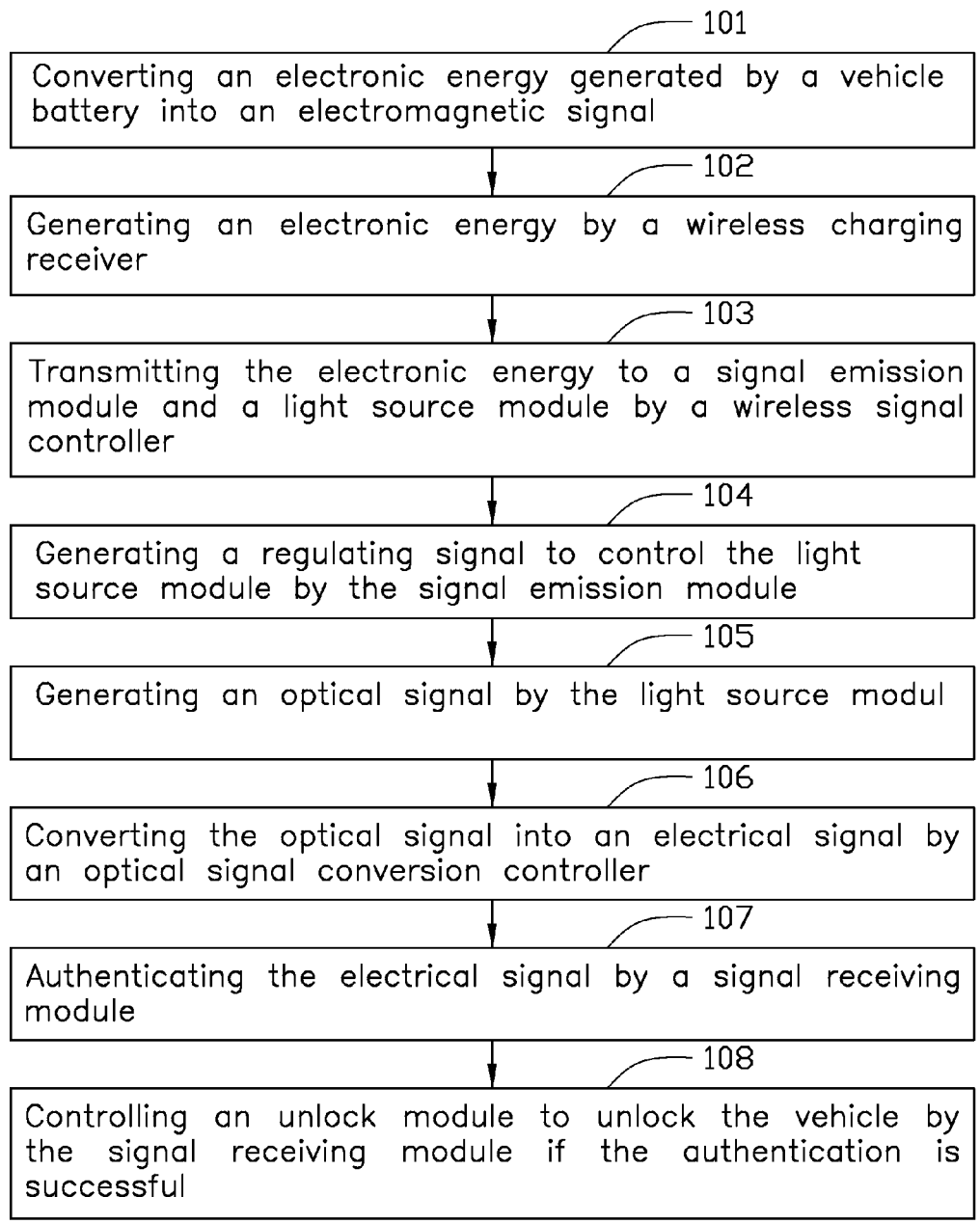
FIG. 2 is a flow diagram of a process for method of operation the vehicle key system of FIG. 1.

FIG. 2 illustrates a flowchart in accordance with an example embodiment. The example method is provided by way of example, as there are a variety of ways to carry out the method. The method described below can be carried out using the configurations illustrated in FIG. 1, for example, and various elements of the figure are referenced in explaining example method. Each block shown in FIG. 2 represents one or more processes, methods or subroutines, carried out in the example method. Furthermore, the illustrated order of blocks is by example only and the order of the blocks can change. Additional blocks may be added or fewer blocks may be utilized, without departing from this disclosure. The example method can begin at block 101.

At block 101, a power conversion controller 240 of a vehicle (not shown) can convert an electronic energy generated by a vehicle battery 250 into an electromagnetic signal configured for wireless charging. A wireless charging transmitter 260 can broadcast the electromagnetic signal by the control of the power conversion controller 240.

At block 102, a wireless charging receiver 130 can generate an electronic energy based on electromagnetic induction when the wireless charging receiver 130 is close to the vehicle.

At block 103, a wireless signal controller 140 can transmit the electronic energy generated by the wireless charging receiver 130 to a signal emission module 110 and a light source module 120.

At block 104, the signal emission module 110 can generate a regulating signal to control the light source module 120.

At block 105, the light source module 120 can generate an optical signal with predetermined Identification (ID) information with the controlling of the signal emission module 110.

At block 106, an optical signal conversion controller 210 can convert the optical signal into an electrical signal with a matching ID information.

At block 107, a signal receiving module 220 can authenticate the electrical signal converted by the optical signal conversion controller 210.

At block 108, if the authentication is successful, the signal receiving module 220 can control an unlock module 230 to unlock the vehicle.

In another embodiment, if the user would not like to charge an transmitting device 100, the process can begin at block 104.

In another embodiment, if the authentication is failure, the vehicle key system can been in an alarm state.

The embodiments shown and described above are only examples. Many details are often found in the art such as the other features of a vehicle key system. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A vehicle key system comprising:
   a transmitting device comprising
      a signal emission module generating a regulating signal;
      a light source module generating an optical signal with predetermined Identification (ID) information by the control of the signal emission module;
      a wireless charging receiver receiving an electromagnetic signal configured for wireless charging and converting the electromagnetic signal to an electronic energy; and
      a wireless signal controller controlling the wireless charging receiver;
   a receiving device comprising
      an optical signal conversion controller receiving the optical signal with the predetermined ID information and converting the optical signal into an electrical signal having matching ID information which is based on the predetermined ID information;
      a signal receiving module receiving and authenticating the electrical signal having matching ID information, and controlling a vehicle to unlock;
      a power conversion controller converting an electronic energy into the electromagnetic signal received by the wireless charging receiver; and
      a wireless charging transmitter transmitting the electromagnetic signal to the wireless charging receiver by the control of the power conversion controller.

2. The vehicle key system as claimed in claim 1, wherein the signal emission module comprises a modulator and a signal converter;
   the modulator generates a predetermined input signal; and
   the signal converter converts the input signal to a dimming control signal configured to control the light source module.

3. The vehicle key system as claimed in claim 1, wherein the light source module comprises a plurality of Light Emitting Diodes (LEDS), and light emitted from the LEDS is visible light.

4. The vehicle key system as claimed in claim 1, wherein the signal receiving module comprises a memory member, and the memory member is configured to save a signal sample.

5. The vehicle key system as claimed in claim 4, wherein the signal receiving module further comprises an identifying member, and the identifying member compares the electrical signal received from the optical signal conversion controller with the signal sample.

6. The vehicle key system as claimed in claim 1, wherein the receiving device further comprises a vehicle battery, and the vehicle battery transmits the electronic energy to the power conversion controller.

7. The vehicle key system as claimed in claim 1, wherein the receiving device further comprises an unlock module, and the unlock module is electrically coupled to the signal receiving module and configured to unlock the vehicle.

8. The vehicle key system as claimed in claim 1, wherein the wireless signal controller transmits the electronic energy generated by the wireless charging receiver to the signal emission module and the light source module.

9. A method for a vehicle key system, the method comprising:
- converting an electronic energy into an electromagnetic signal by a power conversion controller;
- generating an electronic energy by a wireless charging receiver;
- transmitting the electronic energy to a signal emission module and a light source module by a wireless signal controller;
- generating an regulating signal by the signal emission module to control the light source module;
- generating an optical signal by the light source module;
- converting the optical signal into an electrical signal by an optical signal conversion controller;
- authenticating the electrical signal by a signal receiving module; and
- controlling an unlock module to unlock the vehicle by the signal receiving module if the authentication is successful.

10. The method as claimed in claim 9, wherein the method further comprises the vehicle key system being in an alarm state if the authentication is failure.

* * * * *